(12) United States Patent
Sung et al.

(10) Patent No.: US 8,531,460 B2
(45) Date of Patent: *Sep. 10, 2013

(54) CHARACTER PROCESSING APPARATUS AND METHOD

(75) Inventors: Gee-young Sung, Dae-gu (KR); Kaida Xiao, Yongin-si (KR); Du-sik Park, Suwon-si (KR); Young-shin Kwak, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1130 days.

This patent is subject to a terminal disclaimer.

(21) Appl. No.: 11/924,917

(22) Filed: Oct. 26, 2007

(65) Prior Publication Data

US 2008/0111819 A1 May 15, 2008

(30) Foreign Application Priority Data

Nov. 8, 2006 (KR) .......................... 10-2006-110091

(51) Int. Cl.
*G06T 11/00* (2006.01)

(52) U.S. Cl.
USPC ........................... 345/467; 345/471; 715/745

(58) Field of Classification Search
USPC ................. 345/467, 589, 471, 418; 715/745; 382/162, 100, 263; 702/179; 351/223; 455/575.1
See application file for complete search history.

(56) References Cited

U.S. PATENT DOCUMENTS

| | | | | |
|---|---|---|---|---|
| 6,125,213 | A * | 9/2000 | Morimoto | 382/263 |
| 6,570,997 | B2 * | 5/2003 | Noguchi | 382/100 |
| 7,509,151 | B1 * | 3/2009 | Edwards | 455/575.1 |
| 7,654,673 | B2 * | 2/2010 | Sung et al. | 351/223 |
| 2001/0053246 | A1 * | 12/2001 | Tachibana et al. | 382/162 |
| 2003/0046233 | A1 * | 3/2003 | Ara et al. | 705/43 |
| 2003/0177036 | A1 * | 9/2003 | Oka et al. | 702/179 |
| 2004/0183828 | A1 * | 9/2004 | Nichogi et al. | 345/745 |
| 2006/0064298 | A1 | 3/2006 | Lee | |
| 2008/0030686 | A1 * | 2/2008 | Sung et al. | 351/223 |
| 2009/0066722 | A1 * | 3/2009 | Kriger et al. | 345/619 |
| 2009/0141951 | A1 * | 6/2009 | Ogo et al. | 345/173 |
| 2009/0156970 | A1 * | 6/2009 | Sullivan | 601/37 |
| 2011/0175925 | A1 * | 7/2011 | Kane et al. | 345/589 |

FOREIGN PATENT DOCUMENTS

| | | | |
|---|---|---|---|
| JP | 11285022 A | * | 10/1999 |
| JP | 2003-44033 | | 2/2003 |
| JP | 2005-96645 | | 4/2005 |
| JP | 2008146031 A | * | 6/2008 |
| JP | 2008225794 A | * | 9/2008 |
| JP | 2009111559 A | * | 5/2009 |
| KR | 2000-74925 | | 12/2000 |
| KR | 2005-5244 | | 1/2005 |
| KR | 2005-27496 | | 3/2005 |
| WO | WO 2006/093074 A1 | | 9/2006 |

OTHER PUBLICATIONS

European Search Report dated Mar. 24, 2011 in corresponding European Patent Application 07120065.3.
Newton. Science Sensor:, Visual Development and Stimuli, p. 1, Feb. 2000.

* cited by examiner

*Primary Examiner* — Chante Harrison
(74) *Attorney, Agent, or Firm* — Staas & Halsey LLP (57) ABSTRACT

A character processing apparatus and method, wherein the character processing apparatus includes an eyesight age determination module which determines an eyesight age, and a character transformation module which transforms an input character based on character property information of the input character according to the determined eyesight age.

16 Claims, 12 Drawing Sheets

CHARACTER PROCESSING APPARATUS AND METHOD

CROSS-REFERENCE TO RELATED APPLICATION

This application claims the benefit of Korean Application No. -2006-110091, filed on Nov. 8, 2006 in the Korean Intellectual Property Office, the disclosure of which is incorporated herein by reference.

BACKGROUND OF THE INVENTION

1. Field of the Invention

Aspects of the present invention relate to a character processing apparatus and method, and more particularly, to a character processing apparatus and method which can vary the degree of recognition of a character according to the eyesight age of a user by determining the eyesight age of the user and altering the properties of a character according to the determined eyesight age.

2. Description of the Related Art

With recent developments in communication and digital signal processing technologies, various types of display devices such as PC monitors, digital TVs, mobile phones, and personal digital assistants (PDAs) have been developed.

Display devices not only display images or test data but also provide users with a variety of entertainment functions. In addition, display devices can convert images through interaction with users to satisfy users' demands and can display images obtained by the conversion.

In detail, display devices can determine the eyesight of a user and compensate for images according to the result of the determination. Alternatively, given that, as people age, their eyesight gradually weakens, display devices can compensate for images using a predefined method according to the age of a user.

However, people may feel the same image properties (e.g., hue, chroma, and contrast) differently regardless of their eyesight. In addition, the degree to which eyesight weakens as a result of aging may vary from one individual to another.

Figure 1:
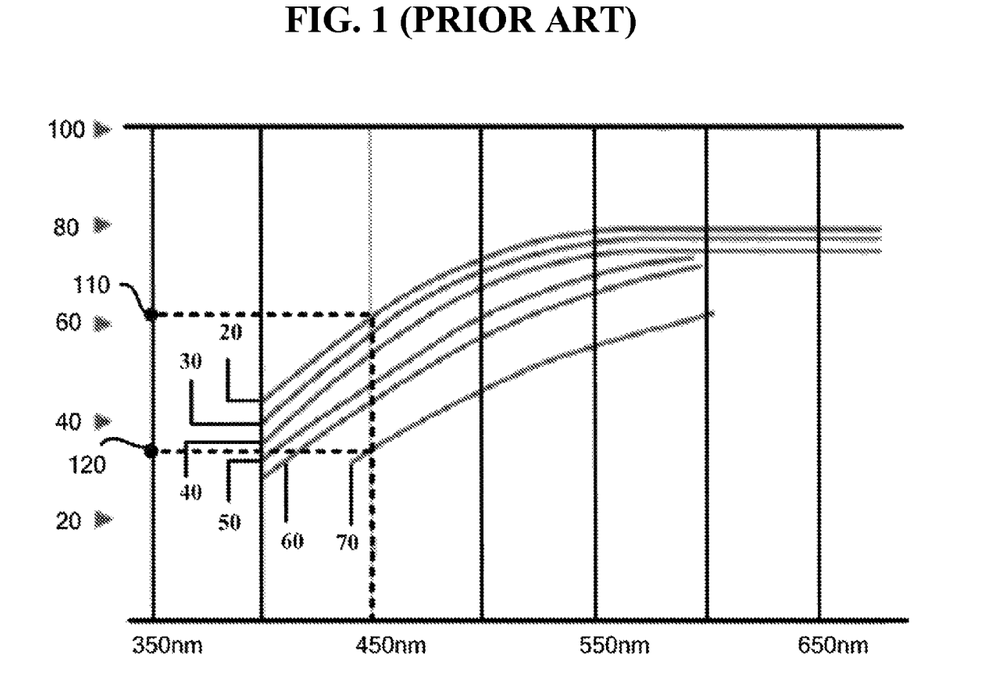
FIG. 1 is a diagram for explaining human color perception that varies according to age.

FIG. 1 is a diagram for explaining human color perception that varies according to age. Referring to FIG. 1, the horizontal axis represents wavelength, and the vertical axis scales human color perception capability between 0 and 100.

Referring to FIG. 1, human color perception varies according to age. A color domain corresponding to a wavelength of about 450 nm is a blue hue domain. The color perception capability (110) of people in their twenties is considerably different from the color perception capability (120) of people in their seventies.

By using the above-mentioned characteristics of human color perception, it is possible to expand the scope of entertainment functions provided by various display devices.

SUMMARY OF THE INVENTION

Aspects of the present invention provide a character processing apparatus and method which can vary the degree of recognition of a character according to the eyesight age of a user by determining the eyesight age of the user and altering the properties of a character according to the determined eyesight age.

According to an aspect of the present invention, there is provided a character processing apparatus. The character processing apparatus includes an eyesight age determination module which determines an eyesight age, and a character transformation module which transforms an input character based on character property information of the input character according to the determined eyesight age.

According to another aspect of the present invention, there is provided a character processing method. The character processing method includes (a) determining an eyesight age, and (b) transforming an input character based on character property information of the input character according to the determined eyesight age.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention are described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory or medium that can direct a computer or other programmable data processing apparatus to function in a particular manner, such that the instructions stored in the computer usable or computer-readable memory produce an article of manufacture including instruction means that implement the function specified in the flowchart block or blocks. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'eyesight age', as used herein, indicates an index indicating the degree of recognition of an image by a user. An eyesight age is clearly differentiated not only from the age of a user but also from the eyesight of a user, which results from an abnormal refraction of the eye.

Figure 2:
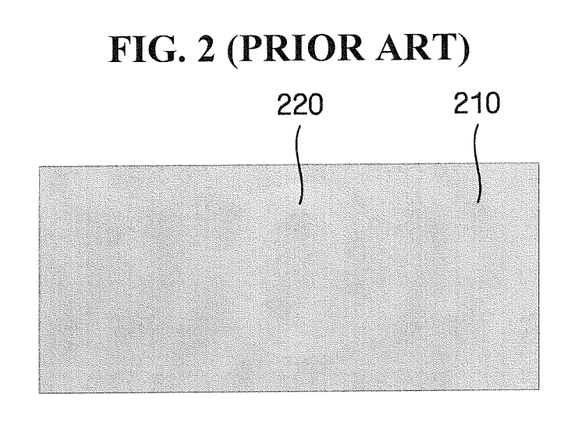
FIG. 2 is a diagram for explaining the basic concept of character processing according to an exemplary embodiment of the present invention.

FIG. 2 is a diagram for explaining the basic concept of character processing according to an exemplary embodiment of the present invention. Referring to FIG. 2, red, green, and blue (RGB) digital values of a background 210 are set to (160, 160, 160), and RGB digital values of a character 220 are set to (160, 160, B). The B value of the character 220 is determined according to an eyesight age. In general, a B value corresponding to a high eyesight age is greater than a B value corresponding to a low eyesight age. Assuming that a B value corresponding to an eyesight age of 50 is 200, a B value corresponding to an eyesight age of 60 is highly likely to be greater than 200. Therefore, when the B value of the character 220 is 180, the degree of recognition of the character 220 by people in their sixties or older is low.

Character perception capability may be varied according to the font size and display duration of a character.

Figure 3:
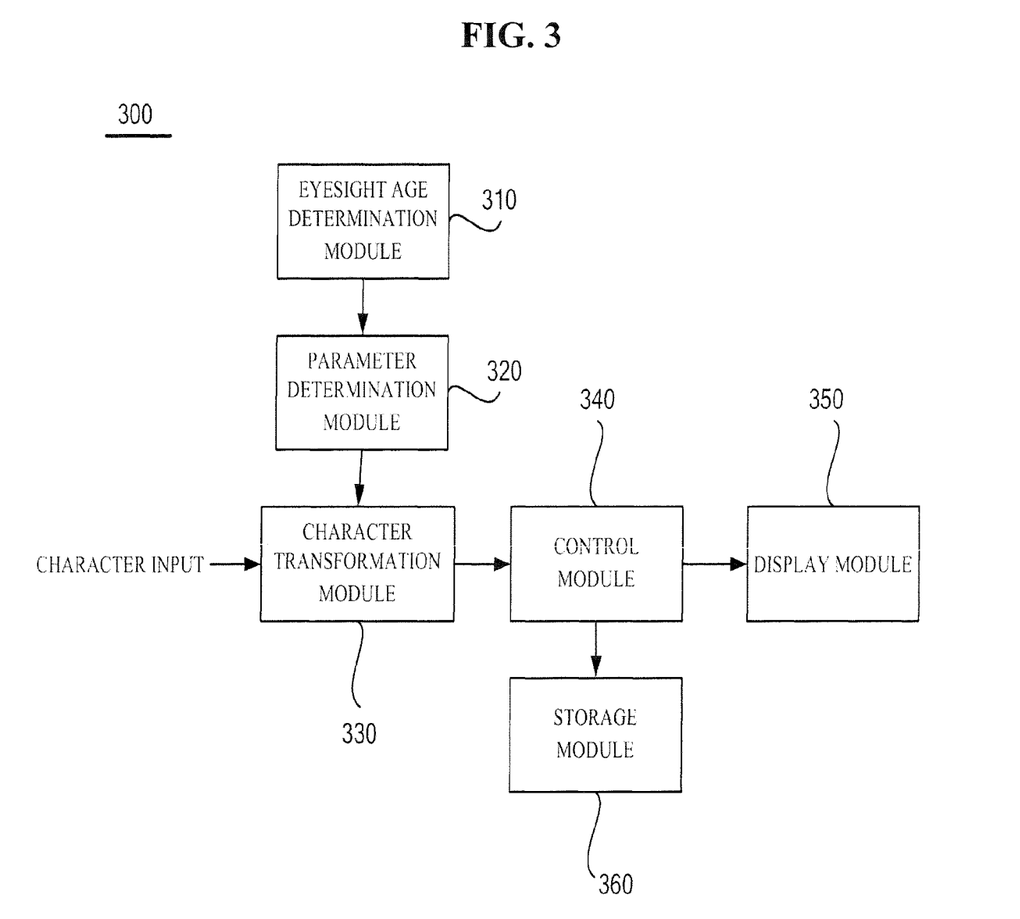
FIG. 3 is a block diagram of a character processing apparatus according to an exemplary embodiment of the present invention.

FIG. 3 is a block diagram of a character processing apparatus 300 according to an exemplary embodiment of the present invention. Referring to FIG. 3, the character processing apparatus 300 includes an eyesight age determination module 310 which determines the eyesight age of a user, a parameter determination module 320 which generates a parameter that corresponds to the determined eyesight age and is needed to transform an input character, a character transformation module 330 which transforms the input character according to the determined parameter, a control module 340 which determines a transmission path of the transformed character under the control of the user, a display module 350 which displays the transformed character, and a storage module 360 which stores the transformed character.

The operations of the eyesight age determination module 310, the parameter determination module 320, the character transformation module 330, the control module 340, the display module 350, and the storage module 360 will hereinafter be described in further detail with reference to FIG. 4.

Figure 4:
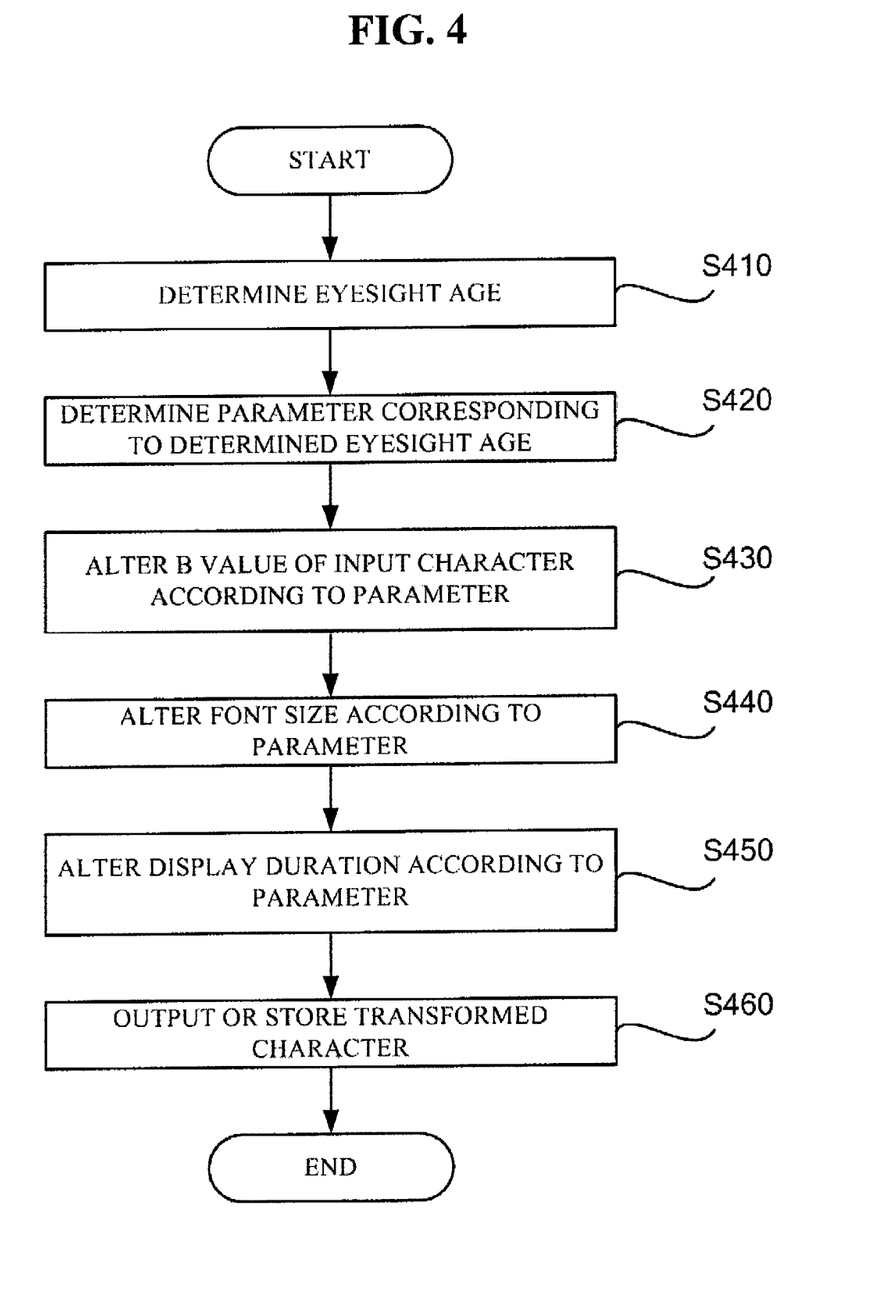
FIG. 4 is a flowchart illustrating a character processing method according to an exemplary embodiment of the present invention.

Referring to FIG. 4, in operation S410, the eyesight age determination module 310 determines the eyesight age of a user. The determination of the eyesight age of the user will hereinafter be described in further detail with reference to FIGS. 5 through 8.

Figure 5:
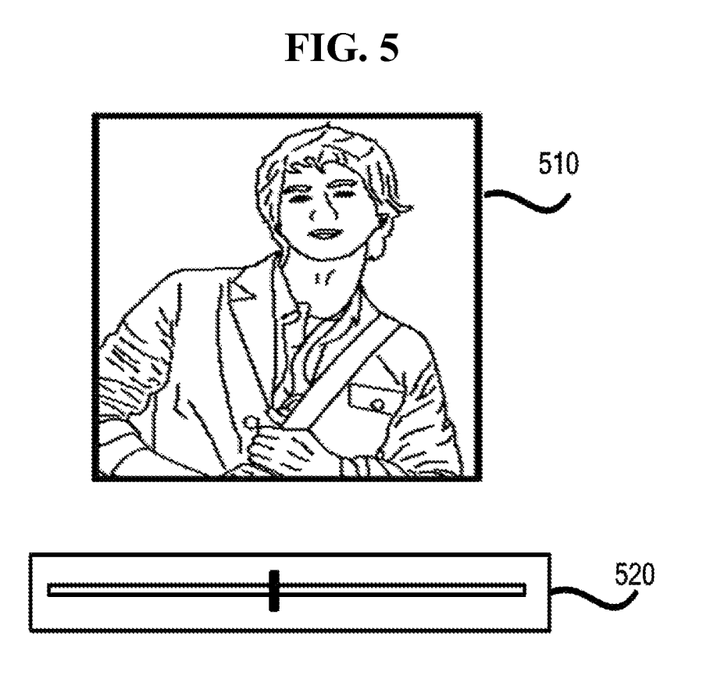
FIG. 5 is a diagram for explaining the basic concept of determination of an eyesight age according to an exemplary embodiment of the present invention.

FIG. 5 is a diagram for explaining the basic concept of the determination of an eyesight age according to another embodiment of the present invention. Referring to FIG. 5, a user may move a pointer in a bar controller 520 laterally and fix the pointer when a preferred image is displayed on a display screen 510. As a result of such simple manipulation, the eyesight age of the user can be determined.

In detail, as the user moves the pointer laterally in the bar controller 920, the properties of an image displayed on the display screen 910 such as luminance, chroma, contrast and hue vary gradually.

The user may stop moving the pointer when a preferred image is displayed on the display screen 910. The preferred image may be interpreted as an image whose visibility is optimized for the user.

Once the user chooses a preferred image by fixing the location of the pointer in the bar controller 520, an eyesight age corresponding to the chosen preferred image is provided to the user. Therefore, the user can easily determine his/her eyesight age through the manipulation of the bar controller 520.

According to an exemplary embodiment of the present invention, the eyesight of the user may be determined based on the probability of the user correctly determining an open direction of a blue Landolt C 220 illustrated in FIG. 2.

For example, if the probability of a group of people at the same age correctly determining an open direction of a blue Landolt C when the blue Landolt C has a predetermined blue value (between 0 and 255) is 50%, an eyesight age corresponding to the predetermined blue value may be determined as the eyesight age of the people. For this, an experiment must be performed on groups of people at different ages in advance.

Figure 6:
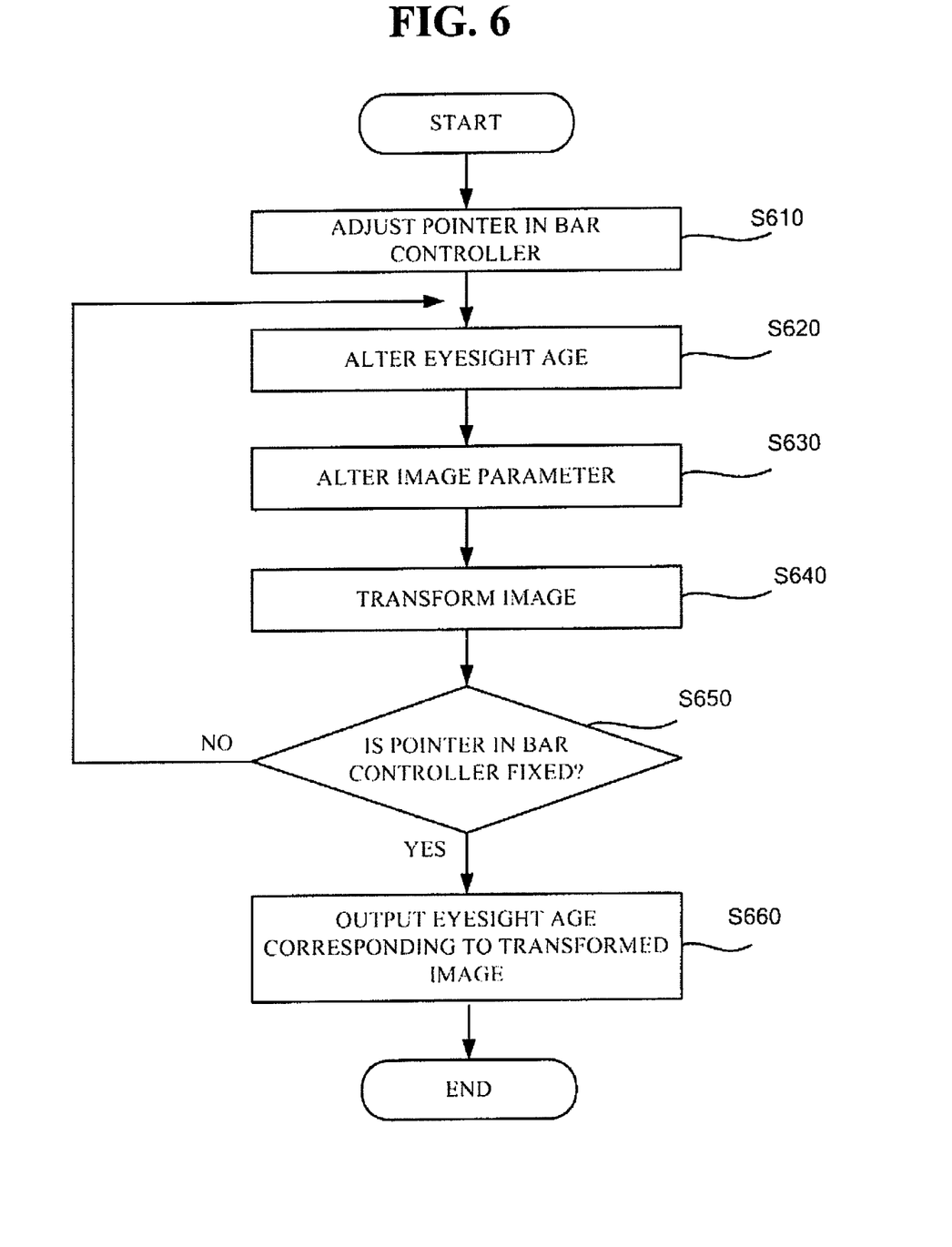
FIG. 6 is a flowchart illustrating a method of determining an eyesight age according to an exemplary embodiment of the present invention.

FIG. 6 is a flowchart illustrating a method of determining an eyesight age according to an exemplary embodiment of the present invention. Referring to FIG. 6, a user manipulates a user input module in order to transform an image displayed by the display module 350. For example, in operation S610, the user may provide user input information through manipulation of a bar controller 520, as illustrated in FIG. 5. The user input information may be interpreted as corresponding to the location of a pointer in the bar controller.

In operation S620, the eyesight age determination module 310 alters an eyesight age according to the user input information. Thereafter, in operation S630, the eyesight age determination module 310 updates an image parameter value corresponding to a previous eyesight age with an image parameter value corresponding to the altered eyesight age. In operation S640, the eyesight age determination module 310 transforms an image currently being displayed by the display module 350 by applying the updated image parameter value.

According to the present embodiment, an image parameter that is needed to transform an image may be determined by experimenting on a number of people at different ages, and then set in the storage module 360 in advance.

For example, the image parameter may be an image parameter that represents a chroma, contrast, luminance or hue property.

Figure 7:
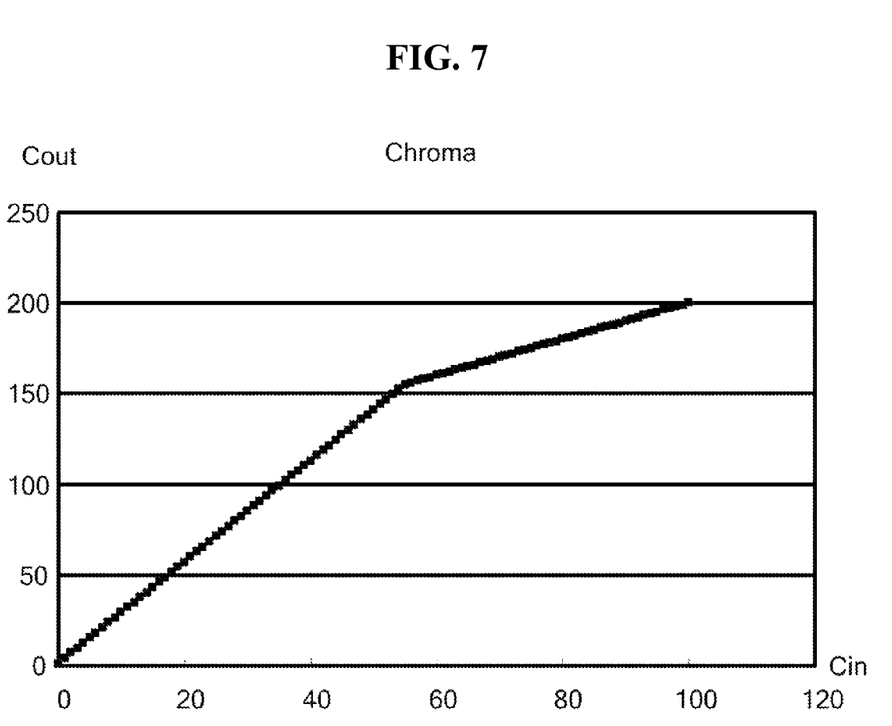
FIG. 7 is a diagram for explaining an image parameter that represents a chroma property, according to an exemplary embodiment of the present invention.

An example of an image parameter that represents a chroma property will hereinafter be described in detail with reference to FIG. 7. Referring to FIG. 7, the horizontal axis scales the chroma of an arbitrary pixel between 0 and 100, and the vertical axis represents a relative chroma enhancement value for each pixel. A graph illustrated in FIG. 7 can be used as an image parameter corresponding to an arbitrary eyesight age.

In short, the eyesight age determination module 310 can transform the image currently being displayed by the display module 350 according to a graph corresponding to the altered eyesight age.

An example of an image parameter that enhances both brightness and contrast properties at the same time will hereinafter be described in detail with reference to FIG. 8. For example, referring to FIG. 8, the length of a first section 802 and a difference between an output pixel value Q3 and an output pixel value Q2 that correspond to an input pixel value P2 belonging to a second section 804, i.e., |Q3−Q2|, may be adjusted according to the pattern of distribution of pixel values of an input image. For example, if most pixel values of the input image are distributed in a low-luminance area, the length of the first section 802 and |Q3−Q2| may both be reduced.

Figure 8:
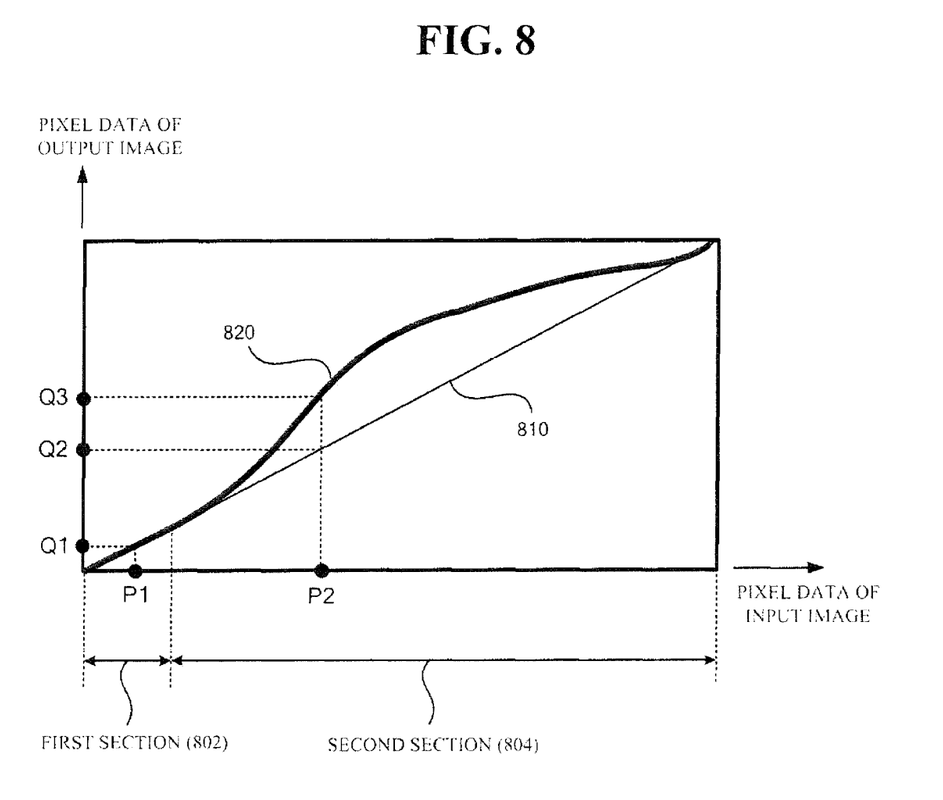
FIG. 8 is a diagram for explaining an image parameter that enhances both lightness and contrast properties at the same time, according to an exemplary embodiment of the present invention.

Referring to FIG. 8, a graph 810 indicates the situation when an input image is not compensated for, and a graph 820 indicates the situation when an input image is compensated for. For example, assuming that each pixel of the input image is represented by eight bits, the input image may have a total of 256 (=$2^8$) pixel data.

The pixel data of the input image may be classified as belonging to one of two sections, i.e., one of the first section 802 and the second section 804. Pixel values belonging to the first section 802 are converted according to the graph 810. In this case, the input image is substantially not transformed. Pixel values belonging to the second section 804 are increased by a predetermined amount.

In detail, since the input pixel value P1 belongs to the first section 802, the input pixel value P1 is readily converted into the output pixel value Q1 according to the graph 810 without the need to be compensated for. On the other hand, since the input pixel value P2 belongs to the second section 804, the input pixel value P2 is converted into the output pixel value Q3, rather than into the output pixel value Q2, according to the graph 820. In other words, the input pixel value P2 is increased by |Q2−Q3|.

FIG. 8 illustrates the variation of each pixel data of an input image. The variation of pixel data of the input image may be interpreted as the variation of the luminance of each pixel of the input image. In other words, pixels of an input image with lower luminance values than a predefined threshold are not subject to image compensation, whereas pixels of the input image with higher luminance values than the predefined threshold are increased by a predetermined compensation amount.

In short, the eyesight age determination module 310 can transform the image currently being displayed by the display module 350 using such a graph as those illustrated in FIG. 8 for each eyesight age as an image parameter that represents brightness and contrast properties for each eyesight age.

An image parameter that represents a hue property may also be stored in the storage module 360 as a graph for each eyesight age.

Referring to FIG. 6, in operation S650, the eyesight age determination module 310 determines whether the user input information provided by the user input module is uniformly maintained for a predetermined amount of time, i.e., whether the location of the pointer in the bar controller is currently fixed. In operation S660, if it is determined in operation S650 that the location of the pointer in the bar controller is currently fixed, the eyesight age determination module 310 outputs an eyesight age corresponding to the transformed image via the display module 350. The fixing of the location of the pointer in the bar controller may be interpreted as being performed when the user encounters and selects a most preferred image. The eyesight age of the user is determined based on the most preferred image selected by the user.

The eyesight age determination module 310 may output an eyesight age that is determined based on an image preferred by the user using an auditory method. For example, the eyesight age determination module 310 may output an eyesight age via a speaker of the character processing apparatus 300 as a sound.

If it is determined in operation S650 that the pointer is currently being moved in the bar controller, rather than being fixed to a certain location in the bar controller, it appears that the user has kept moving the pointer in the bar controller.

In this case, operations S620 through S650 are performed again. In other words, the transformation of the image currently being displayed by the display module 350 continues until the user selects a preferred image.

According to the present embodiment, a bar controller is used as a user input module. However, the present invention is not restricted to this. In other words, any type of input tool (e.g., four direction keys or number keys on a mobile phone) that can transform an image displayed by the display module 350 can be used as a user input module.

The aforementioned method of determining an eyesight age is exemplary. In other words, the eyesight age of a user can be determined using various methods other than that set forth herein.

Referring to FIG. 4, once the eyesight age of the user is determined in the aforementioned manner, the parameter determination module 320 determines a parameter that is needed to change an input character, according to the determined eyesight age in operation S420. The character processing apparatus 300 may store a default parameter value for each eyesight age in advance as a table, and determine the parameter by extracting a default parameter value corresponding to the determined eyesight age provided by the eyesight age determination module 310. Alternatively, the character processing apparatus 300 may use the determined eyesight age provided by the eyesight age determination module 310 as a parameter. In this case, the parameter determination module 320 is optional.

Once the parameter is determined by the parameter determination module 320, the character transformation module 330 alters the properties of the input character. Examples of the properties of the input character include a B value, font size, and display duration of the input character. The properties of the input character can be interpreted as affecting the recognition of the input character by the user.

The transformation of the input character using the properties of the input character will hereinafter be described in detail.

Figure 9:
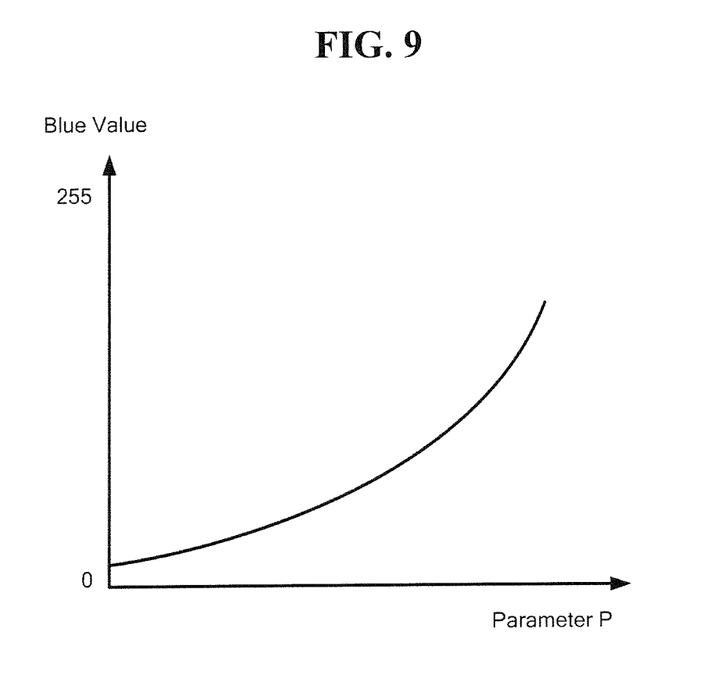
FIG. 9 is a diagram for explaining the relationship between a parameter and a blue value, according to an exemplary embodiment of the present invention.

In operation S430, a B value of the input character is altered according to the determined parameter. The relationship between a parameter P and a blue value (ranging between 0 and 255) is illustrated in FIG. 9.

Figure 10:
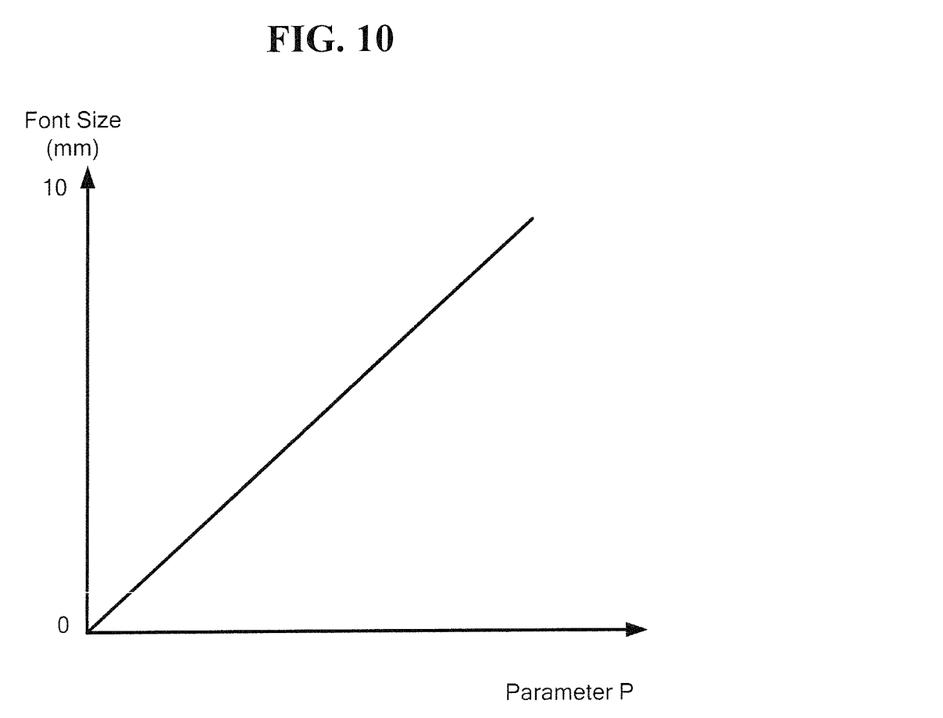
FIG. 10 is a diagram for explaining the relationship between a parameter and font size, according to an exemplary embodiment of the present invention.

In operation S440, the font size of the input character is altered according to the determined parameter. The relationship between the parameter P and font size (mm) is illustrated in FIG. 10.

Figure 11:
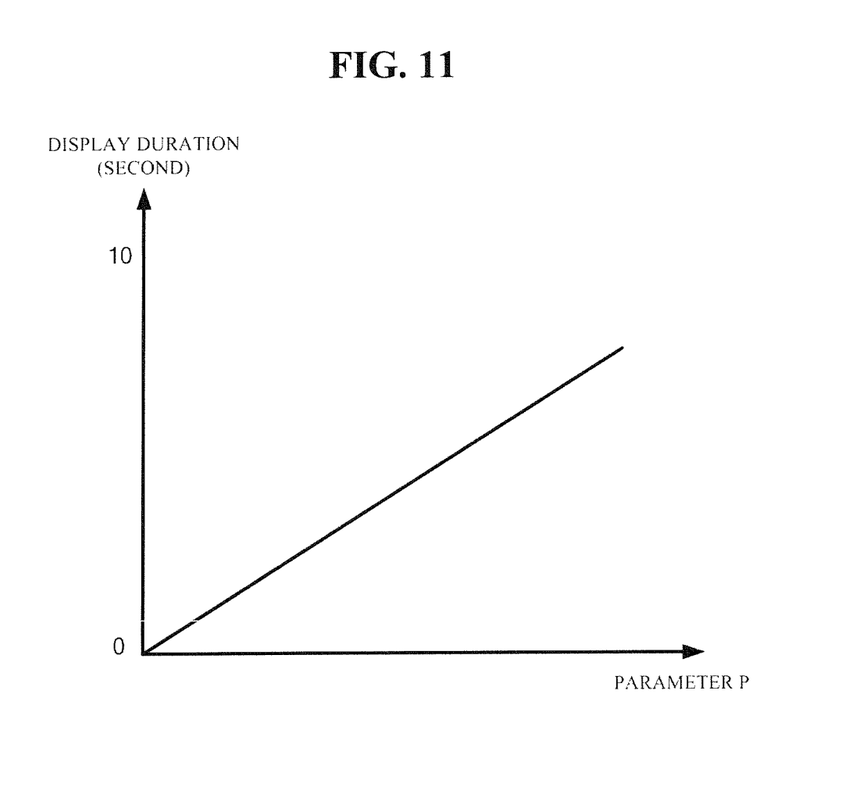
FIG. 11 is a diagram for explaining the relationship between a parameter and display duration, according to an exemplary embodiment of the present invention.

In operation S450, the display duration of the input character is altered according to the determined parameter. The relationship between the parameter P and display duration (sec) is illustrated in FIG. 11.

Operations S430 through S450 may be performed in a different order from that illustrated in FIG. 4. FIGS. 9 through 11 are exemplary. Thus, various graphs other than those illustrated in FIGS. 9 through 11 can be used to transform the input character.

The input character may be a character currently being input to the character transformation module 330 by the user or a character stored in the character processing apparatus 300 in advance.

In operation S460, the transformed character provided by the character transformation module 330 is output to the user or is stored under the control of the control module 340.

In other words, the control module 340 may display the transformed character provided by the character transformation module 330 to the user through the display module 350 or may store the transformed character provided by the character transformation module 330 in the storage module 360.

In addition, the transformed character provided by the character transformation module 330 may be transmitted to a mobile terminal as a test message. In this case, the eyesight age of a user of the mobile terminal can be determined, and this will hereinafter be described in detail with reference to FIG. 12.

Figure 12:
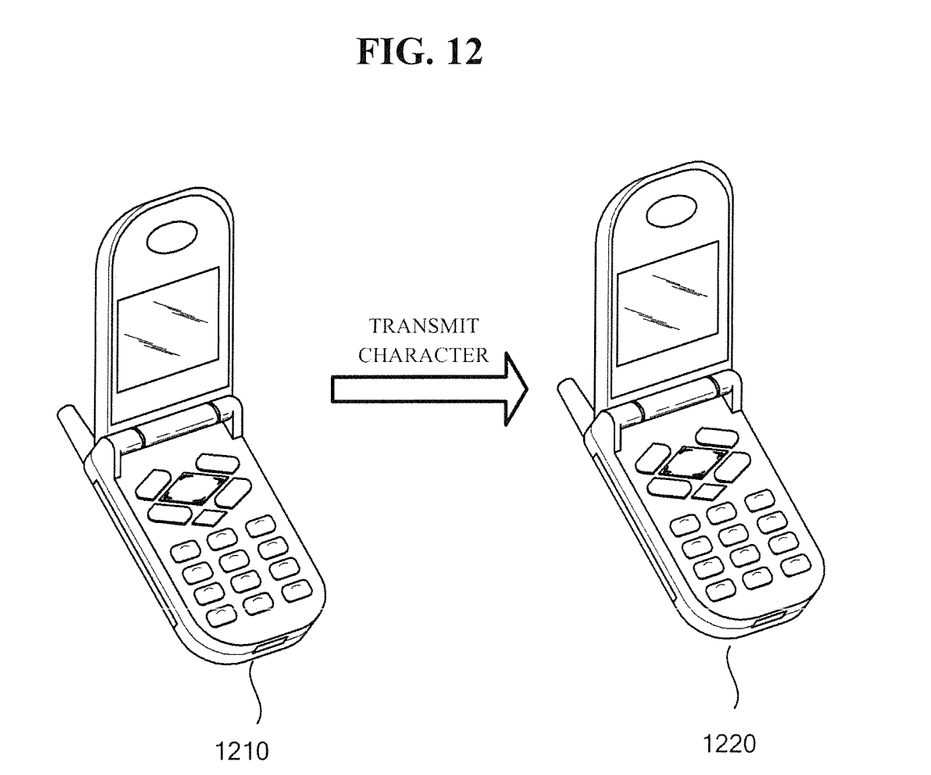
FIG. 12 is a diagram for explaining the determination of an eyesight age according to an exemplary embodiment of the present invention.

Referring to FIG. 12, assume that mobile terminal A (1210) provides an eyesight age determination function and a character processing function according to an exemplary embodiment of the present invention and that mobile terminal B (1220) does not provide the eyesight age determination function.

A user of mobile terminal A (1210) transmits a character processed using the character processing method according to the present invention to a user of mobile terminal B (1220). If the user of mobile terminal B (1220) cannot recognize the character transmitted by the user of mobile terminal A (1210), the user of mobile terminal A (1210) may increase an eyesight age and transmit a character again to the user of mobile terminal B (1220). This process may be performed repeatedly until the user of mobile terminal B (1220) can recognize a character transmitted by the user of mobile terminal A (1210).

According to the present embodiment, an input character may be rendered in blue in a gray background image. The transformation of the input character may be performed by adjusting the B value of the RGB values (160, 160, B) of the input character.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to aspects of the present invention, it is possible to provide an entertainment function that can vary the degree of recognition of a character by a user according to the eyesight age of the user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A character processing apparatus comprising: at least one processor, executing:
    an eyesight age determination module which determines an eyesight age of an individual user based on the individual user changing at least one of luminance, chroma, contrast, or hue of an image; and
    a character transformation module which alters properties of an input character based on character property information according to the determined eyesight age,
    wherein the character property information comprises display duration.

2. The character processing apparatus of claim 1, further comprising a parameter determination module which determines a parameter corresponding to the determined eyesight age,
    wherein the character transformation module transforms the input character based on character property information of the input character according to the determined parameter.

3. The character processing apparatus of claim 1, wherein the eyesight age determination module determines the eyesight age according to user input information input by a user.

4. The character processing apparatus of claim 1, wherein the character property information comprises a blue (B) value.

5. The character processing apparatus of claim 1, wherein the character property information comprises font size.

6. The character processing apparatus of claim 1, further comprising a storage module which stores the transformed character.

7. The character processing apparatus of claim 1, further comprising a display module which displays the transformed character.

8. The character processing apparatus of claim 1, further comprising a control module which transmits the transformed character to a mobile terminal upon the request of a user.

9. A character processing method comprising:
- determining, by at least one processor, an eyesight age of an individual user based on the individual user changing at least one of luminance, chroma, contrast, or hue of an image; and
- altering, by the at least one processor, properties of an input character based on character property information according to the determined eyesight age,
- wherein the character property information comprises display duration.

10. The character processing method of claim 9, wherein:
- the determining of the eyesight age comprises determining a parameter corresponding to the determined eyesight age; and
- the transforming of the input character comprises transforming the input character based on character property information of the input character according to the determined parameter.

11. The character processing method of claim 9, wherein the determining of the eyesight age comprises determining the eyesight age according to user input information input by a user.

12. The character processing method of claim 9, wherein the character property information comprises a blue (B) value.

13. The character processing method of claim 9, wherein the character property information comprises font size.

14. The character processing method of claim 9, further comprising storing the transformed character.

15. The character processing method of claim 9, further comprising displaying the transformed character.

16. The character processing method of claim 9, further comprising transmitting the transformed character to a mobile terminal upon the request of a user.

* * * * *